United States Patent
Liu et al.

(10) Patent No.: US 6,238,796 B1
(45) Date of Patent: May 29, 2001

(54) MAGNETIC RECORDING MEDIA

(75) Inventors: Youmin Liu, Palo Alto; Vidyadhara K. Gubbi, Milpitas; Chung Y. Shih, Cupertino, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/179,208

(22) Filed: Oct. 27, 1998

Related U.S. Application Data

(60) Provisional application No. 60/076,573, filed on Mar. 2, 1998, and provisional application No. 60/075,010, filed on Feb. 17, 1998.

(51) Int. Cl.[7] .................................................. G11B 5/725
(52) U.S. Cl. .......................... 428/408; 428/421; 428/422; 428/694 TC; 428/694 TF; 428/900
(58) Field of Search ..................................... 428/421, 422, 428/694 TC, 694 TF, 900, 65.8, 408

(56) References Cited

U.S. PATENT DOCUMENTS

| | | | |
|---|---|---|---|
| 4,188,434 | * 2/1980 | Loran | 428/65 |
| 4,803,125 | * 2/1989 | Takeuchi et al. | 428/411.1 |
| 4,880,687 | * 11/1989 | Yokoyama et al. | 428/141 |
| 5,049,410 | * 9/1991 | Johary et al. | 427/131 |
| 5,587,217 | 12/1996 | Chao et al. | 428/65.4 |
| 5,591,481 | * 1/1997 | Takahashi et al. | 427/131 |
| 5,674,638 | * 10/1997 | Grill et al. | 428/694 TC |
| 6,007,896 | * 12/1999 | Bhushan | 428/141 |

FOREIGN PATENT DOCUMENTS

| | | |
|---|---|---|
| 62-257615 | 11/1987 | (JP) . |
| 63-23172 | 9/1988 | (JP) . |
| 63-50235 | 2/1989 | (JP) . |

OTHER PUBLICATIONS

Karis et al., "Characterization of a solid fluorocarbon film on magnetic recording media", J. Vac. Sci. Technol. A 15(4), Jul./Aug. 1997, pp. 2382–2387.

* cited by examiner

*Primary Examiner*—Stevan A. Resan
(74) *Attorney, Agent, or Firm*—Fish & Richardson P.C.

(57) ABSTRACT

A thin-film magnetic recording disc for use with a read/write head in a disc drive includes a substrate, a magnetic recording film disposed over the substrate, and a protective overcoat on the recording film. The recording disc has an outer layer that includes a solid fluorocarbon and a perfluoropolyether (PFPE) oil. The disc can be used as a data storage media for a digital computer and, in particular, with a read/write head in a disc drive. The addition of the fluorocarbon layer can improve the tribology of the disc, thereby reducing wear and improving the long-term performance of the magnetic disc.

5 Claims, 2 Drawing Sheets

| LUBRICANT | FORMULA | MOLECULAR WEIGHT DALTONS |
|---|---|---|
| Fomblin Z-25 | $CF_3\text{-}O\text{-}(CF\text{-}CF_2\text{-}O)_m\text{-}(CF_2\text{-}O)_n\text{-}CF_3$ | 12,800 |
| Fomblin Z-15 | $CF_3\text{-}O\text{-}(CF_2\text{-}CF_2\text{-}O)_m\text{-}(CF_2\text{-}O)_n\text{-}CF_3$ (m/n ~ 2/3) | 9100 |
| Fomblin Z-03 | $CF_3\text{-}O\text{-}(CF_2\text{-}CF_2\text{-}O)_m\text{-}CF_2\text{-}O)_n\text{-}CF_3$ | 3600 |
| Fomblin Z-Dol | $HO\text{-}CH_2\text{-}CF_2\text{-}O\text{-}(CF_2\text{-}CF_2\text{-}O)_m\text{-}(CF_2\text{-}O)_n\text{-}CF_2\text{-}CH_2\text{-}O\text{-}H$ | 2000 |
| Fomblin AM 3001 | Piperonyl-$O\text{-}CH_2\text{-}CF_2\text{-}O\text{-}(CF_2\text{-}CF_2\text{-}O)_m\text{-}(CF2\text{-}O)_n\text{-}CF_2\text{-}CH_2\text{-}O$-piperonyl[1] | 3100 |
| Fomblin YR | $CF_3\text{-}O\text{-}(\underset{F}{\overset{CF_3}{C}}\text{-}CF_2\text{-}O)_m\text{-}(CF_2\text{-}O)_n\text{-}CF_3$ (m/n ~ 40/1) | 6800 |
| Demnum S-100 | $CF_3\text{-}CF_2\text{-}CF_2\text{-}O\text{-}(CF_2\text{-}CF_2\text{-}CF_2\text{-}O)_m\text{-}CF_2\text{-}CF_3$ | 5600 |
| Krytox 143AD | $CF_3\text{-}CF_2\text{-}CF_2\text{-}O\text{-}(\underset{F}{\overset{CF_3}{C}}\text{-}CF_2\text{-}O)_m\text{-}CF_2\text{-}CF_3$ | 2600 |

[1] 3,4-methylenedioxybenzyl

FIG. 4

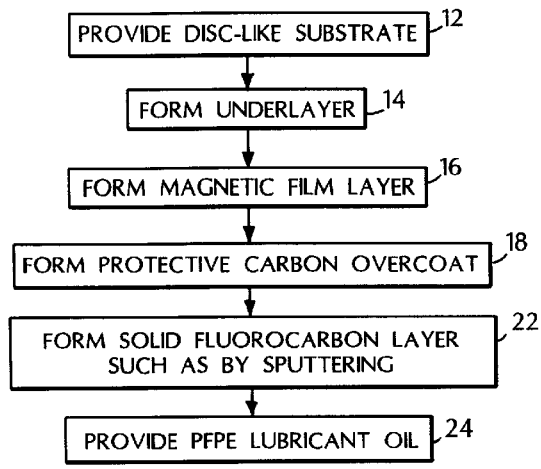

FIG. 5

MAGNETIC RECORDING MEDIA

CROSS REFERENCE TO RELATED APPLICATIONS

This application claims the priority of U.S. Provisional Application Serial No. 60/076,573, filed Mar. 2, 1998, and Ser. No. 60/075,010, filed Feb. 17, 1998.

BACKGROUND

The present invention relates generally to the use of lubricants in connection with magnetic recording media and, in particular, to the use of lubricants for reducing frictional coefficients of thin-film recording media.

Thin-film magnetic discs or media are used as data storage media for digital computers. The discs typically are formed by successively sputtering various layers onto a rigid disc substrate. The sputtered layers can include an underlayer, a magnetic layer, and a carbon overcoat which protects the magnetic layer from corrosion and oxidation and reduces frictional forces between the disc and a read/write head.

The surface of the disc is often lubricated with a thin film of a lubricant to reduce friction between the head and the disc, particularly during start and stop cycles. The lubricity of a disc-head interface generally is measured in terms of dynamic and/or static coefficients of friction or stiction values. Dynamic stiction values can be measured using a standard drag test in which the drag produced by contact of a read/write head with a disc is determined at a constant spin rate, for example, 1 rotation per minute (rpm). Static stiction values can be measured using a standard contact start-stop (CSS) test in which the peak level of friction is measured as the disc starts rotating from zero to a selected revolution rate, for example, 5,000 rpm. After the peak friction is measured, the disc is brought to rest, and the start-stop process is repeated for a selected number of start-stop cycles.

For good long-term disc and drive performance, the disc-head interface should retain a relatively low stiction value after many start-stop cycles or contacts between the disc and a read/write head. For example, a drive manufacturer may require that the disc-head interface have a stiction value no greater than 1.5 or 3 after 15,000 start-stop cycles. A disc that meets such requirements can tolerate at least 15,000 start-stop cycles without exhibiting high friction characteristics that would interfere with the read/write operations. Improvements in the manufacture of discs are desirable to reduce the wear and improve the long-term performance of the magnetic discs.

SUMMARY

In general, according to one aspect, a thin-film magnetic recording disc for use with a read/write head in a disc drive includes a substrate, a magnetic recording film disposed over the substrate, and a protective overcoat on the recording film. The recording disc has an outer layer that includes a solid fluorocarbon and a perfluoropolyether (PFPE) oil.

Various implementations can include one or more of the following features. The protective overcoat can include carbon and the solid fluorocarbon can be formed, for example, by a sputtering process. In some implementations, the solid fluorocarbon film has a thickness in the range of about 10–40 angstroms, and the amount of fluorine atoms in the solid fluorocarbon film can be in the range of about 8–30 percent.

In another aspect, a method of fabricating a thin-film magnetic recording disc is described.

The disc can be used as a data storage media for a digital computer and, in particular, with a read/write head in a disc drive. The addition of the fluorocarbon layer and the PFPE oil can improve the tribology of the disc, thereby reducing wear and improving the long-term performance of the magnetic disc.

In another aspect, the invention features a magnetic recording apparatus including a read/write head for transmitting and receiving information to and from a magnetic recording medium, and a magnetic recording medium having an outer layer comprising a solid fluorocarbon and a perfluoropolyether (PFPE) oil.

The invention also features a magnetic recording apparatus including a read/write head and a magnetic storage medium having means for reducing wear of the magnetic storage medium when information is transmitted to or read from the magnetic storage medium by the read/write head.

Other features and advantages will be readily apparent from the following detailed description, the accompanying drawings, and the claims.

BRIEF DESCRIPTION OF THE DRAWINGS

FIG. 4 is a table listing exemplary perfluoro; polyether compounds for use in accordance with the invention.

FIG. 5 is a flow chart illustrating exemplary steps for forming a magnetic disc according to the invention.

DESCRIPTION OF THE PREFERRED EMBODIMENTS

Figure 1:
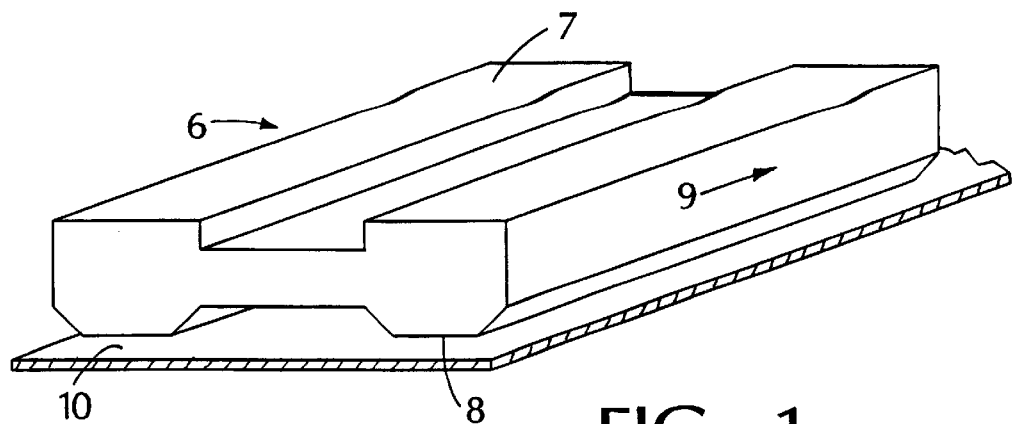
FIG. 1 illustrates a magnetic recording head and a magnetic recording medium.

FIG. 1 illustrates a magnetic recording head 6 that forms part of a head arm assembly for a computer disc drive. The head 6 includes a slider 7 having air bearing surfaces 8. The head 6 transmits and receives information to and from a thin-film magnetic recording medium 10 which moves relative to the air bearing surfaces 8 in the direction of the arrow 9.

Figure 2:
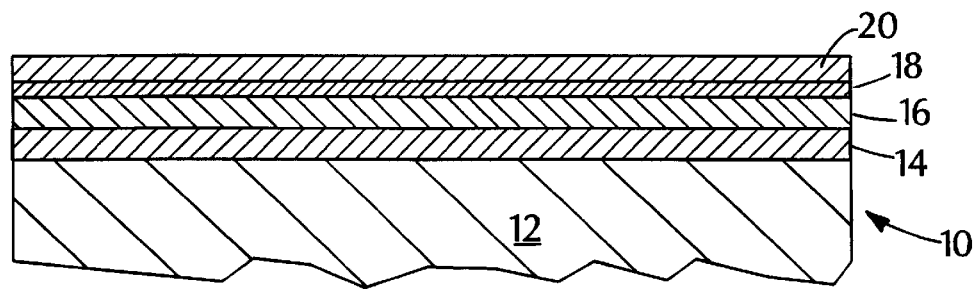
FIG. 2 shows a cross-section of a thin-film recording medium according to the invention.

Referring to FIGS. 2 and 5, the thin-film medium or disc 10 includes a rigid disk-like substrate 12 and various thin-film layers, including a crystalline underlayer 14, a magnetic thin-film layer 16, an overcoat 18 and an outer layer 20, successively formed over the substrate.

The substrate 12 can be, for example, a textured substrate such as a conventional surface-coated, textured aluminum substrate, or a textured glass or ceramic substrate.

The crystalline underlayer 14 can include, for example, a sputtered chromium (Cr) underlayer 14 having a thickness in the range of about 300 to 3,000 angstroms (A) Alternatively, the underlayer 14 can be formed of a chromium-based alloy, such as CrGd, CrV, CrTi or CrSi.

The magnetic film layer 16 can be, for example, a cobalt-based alloy, in other words, an alloy containing at least 50% cobalt, which is formed on the underlayer 14 by sputtering or other known techniques. Exemplary thin-film alloys include binary and ternary alloys such as Co/Cr, Co/Ni, Co/Cr/Ta, Co/Ni/Pt and Co/Cr/Ni, and quaternary and five-element alloys such as Co/Ni/Cr/Pt, Co/Cr/Ta/Pt, Co/Cr/Ta/Pt/B and Co/Cr/Ni/Pt/B.

A wear-resistant, protective carbon overcoat 18 is sputtered over the magnetic recording layer 16. Exemplary overcoat materials 18 include amorphous carbon ($\alpha$-C:H), amorphous carbon-nitride ($\alpha$-C:N) and $\alpha$-C:H:N. Other materials also can be used as the protective overcoat 18. In some implementations, the carbon overcoat 18 has a thickness of approximately 100–120 Å.

Figure 3:
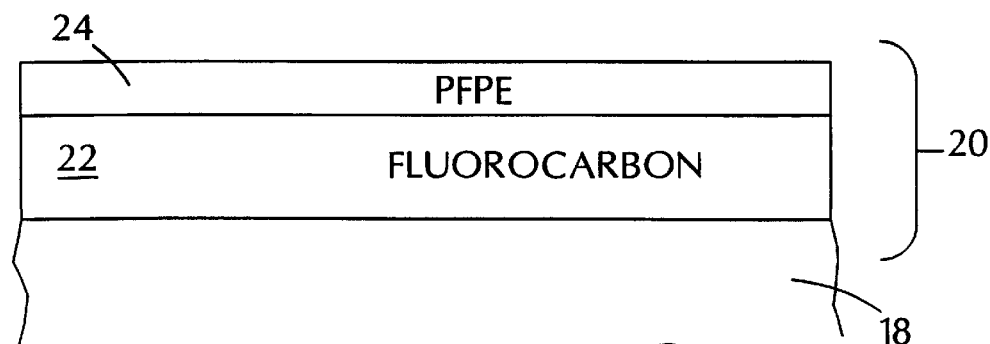
FIG. 3 shows further details of the thin-film recording medium of FIG. 2.

The outer layer 20 includes a solid fluorocarbon layer 22 and a perfluoropolyether (PFPE) oil 24 (FIG. 3).

The fluorocarbon layer 22 can be formed, for example, by a sputtering process such as direct current (DC) magnetron sputtering. In one implementation, a mixture of argon (Ar) and trifluoromethane ($CHF_3$) gases is used to form the plasma phase. The ratio of fluorine to carbon in the film 22 depends on the ratio of $CHF_3$ to Ar. At relatively low ratios, a C—F structure tends to form. On the other hand, as the ratio of $CHF_3$ to Ar gas increases, $CF_2$ and $CF_3$ structures form in the film 22, and the film tends to polymerize. In some implementations, $CF_2$, or $CF_4$, and $H_2$ gases can be used instead of, or in addition to, $CHF_3$ to form the plasma phase. Preferably, the amount of fluorine atoms in the solid fluorocarbon film 22 is in the range of about 8–30 percent. The fluorocarbon film 22 can have a thickness, for example, of about 10–40 Å.

Once the solid fluorocarbon layer 22 has been formed, the disc 10 is coated with a perfluoropolyether (PFPE) oil 24, in other words, a composition which is water-insoluble and non-volatile. Such PFPE oils include perfluoroalkylpolyether compounds of the formula R—O—$(CX_2CY_2$—$))_m$—$(CZ_2$—$O)_n$—R, where m and n are integers; R is hydrogen (H), $CF_3$, $CH_3$, piperonyl or R'; where R' is $CF_2CH_2OH$, $CF_2$—$CH_2$—$O$—$CH_2$—$CHOH$—$CH_2$—$OH$, $CF_2$—$O$—$CH_2$—$O$—$CH_2$—$CH_2$—$OH$, $CF_2CH_2O$—$CF_3$, $CF_2CH_2OCH_3$, or $CF_2CH_2O$-pipeonyl; $CX_2$ is $CF_2$ or CF ($CF_3$); and $CY_2$ and $CZ_2$ are $CF_2$. Illustrative PFPE oil compounds are listed in the table of FIG. 4. The class also includes compounds of the formula $CF_3CF_2CF_2$—$O$—$(Z$—$O)_m$—$CF_2CF_3$, where Z is $CF(CF_3)$—$CF_2$ or $CF_2CF_2CF_2$. Some PFPE oils are commercially available from Ausimont U.S.A., Inc. under the names Fomblin PFPE AM 2001, Fomblin PFPE Z-DOL 2000 and Z-DOL 4000, Fomblin PFPE Z-DOL TX and Fomblin PFPE Z-TeTraol 2000. In general, the perfluoropolyether oils may be obtained commercially as noted above, or are prepared by known chemical methods.

The disc 10 can be coated with the PFPE layer 24 by any one of several techniques. In one approach, the PFPE lubricant 24 may be applied conventionally by spray bull using a tape roll or endless belt tape device designed to burnish and lubricate a finished disc surface.

In a second approach, the PFPE layer 24 is applied by a spin coating technique, wherein PFPE lubricant is applied at or near the center of the disc and is then spread to the outer edge of the disc by centrifugal force due to the spinning of the disc.

In a third approach, the PFPE is applied using a dipping method. In one type of dipping method, called the "pull-up" or "lift-out" method, a disc is submerged in a dilute solution of lubricate and then gradually lifted out of the solution at a selected rate such that the lubricant is evenly coated onto the disc surface. In a second type of dipping method, called the "gravity draining" method, the disc is dipped with a vertical orientation into a dilute solution of lubricant for a selected time, and the solution is allowed to drain from the dipping tank at a controlled rate until the level of solution is no longer touching the disc. Evaporation of solvent from the disc surface produces a layer of lubricant on the disc. The thickness of the layer will depend on the initial concentration of lubricant in the lubricant solution, the time of exposure of the disc to the solution, the draining rate (or lifting rate, if a lift-out technique is used), and the solubility of the lubricant(s) in the solvent.

For deposition onto the disc surface, the PFPE is dissolved in a solvent, typically at a concentration of between about 0.001% and 1% in volume relative to the solvent. Exemplary solvents in which the PFPE oils are soluble include CFC-113 ($CClF_2$ $CCl_2F$, "VERTREL XF" ($CF_3CHFCHFCF_2CF_3$) and "VERTREL 245 ($C_6F_{12}$)", and perfluoro-carbons such as perflouorohexane.

The thickness of the PFPE layer 24 formed by the dipping technique can be reduced by using a more dilute lubricant solution, by shortening the duration of exposure if the disc to the PFPE solution, or by using a solvent in which the PFPE is more readily soluble. Similar principles apply if a spin-coat or spray-buff technique is used.

The disc 10 can be used as a data storage media for a digital computer and, in particular, with a read/write head in a disc drive. In general, stress tests and standard contact start-stop (CSS) tests indicate that the addition of the fluorocarbon layer with the PFPE oil can improve the tribology of the disc, reducing the wear and stiction.

Although the theory of operation of the foregoing technique is not critical to the invention, it is believed that the high affinity between the liquid PFPE 24 and the solid fluorocarbon film 22 is a result of the PFPE's fluoroether chain as well as the —CFX end group.

Other implementations are within the scope of the following claims.

What is claimed is:

1. A thin-film magnetic recording medium comprising:

a substrate;

a magnetic recording film disposed over the substrate;

a protective carbon overcoat disposed directly on the recording film; and an outer layer on the carbon overcoat, the outer layer comprising a solid fluorocarbon sub-layer including a fluorine-doped diamond-like carbon material, and a perfluoropolyether (PFPE) oil—layer on the solid fluorocarbon sub-layer.

2. The recording medium of claim 1 wherein the solid fluorocarbon sub-layer has a thickness in the range of about 10–40 angstroms.

3. The recording medium of claim 1 wherein the percentage of fluorine in the solid fluorocarbon sub-layer is in the range of about 8–30 atomic percent.

4. The recording medium of claim 1, wherein the solid fluorocarbon is formed by a sputtering process.

5. A magnetic recording apparatus comprising:

(a) a magnetic recording medium including:

a substrate a magnetic recording film is disposed over the substrate;

a protective carbon overcoat disposed directly on the recording film; and an outer layer on the carbon overcoat, the outer layer comprising a solid fluorocarbon sub-layer including a fluorine-doped diamond-like carbon material, and a perfluoropolyether (PFPE) oil—layer on the solid fluorocarbon sub-layer, and (b) a read/write head for transmitting and receiving information to and from the magnetic recording medium.

* * * * *